Jan. 30, 1968   R. L. ROBINSON   3,365,843
FIXTURE FOR CUTTING TOOLS
Filed March 8, 1965   2 Sheets-Sheet 1
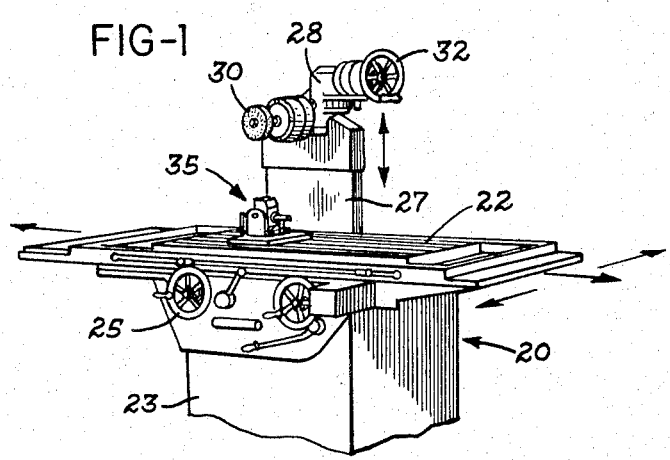
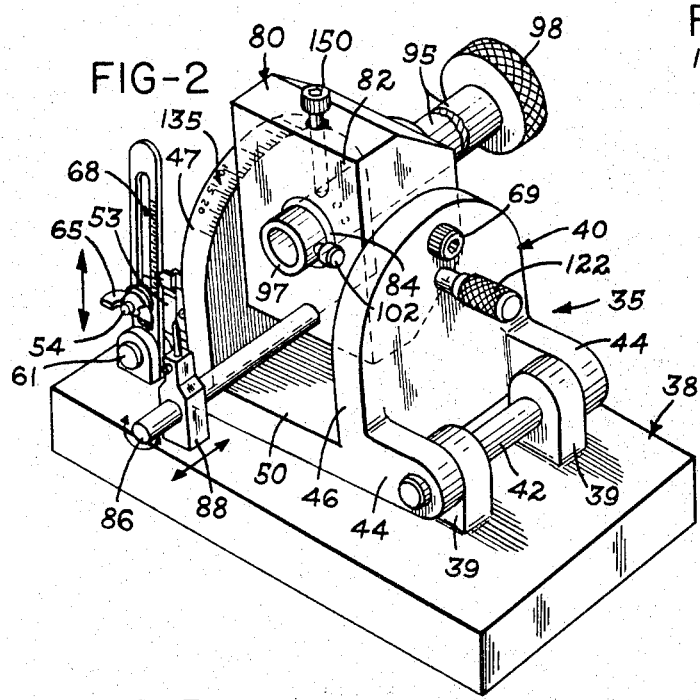
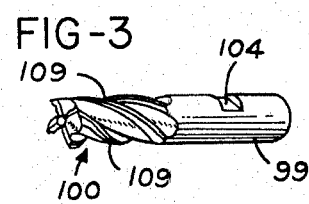
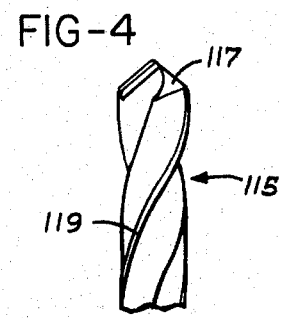
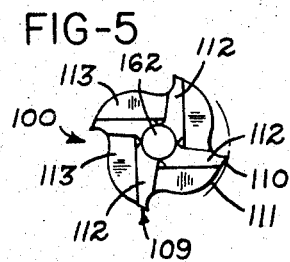
INVENTOR.
ROLAND L. ROBINSON
BY
Marechal, Biebel, French & Bugg
ATTORNEYS

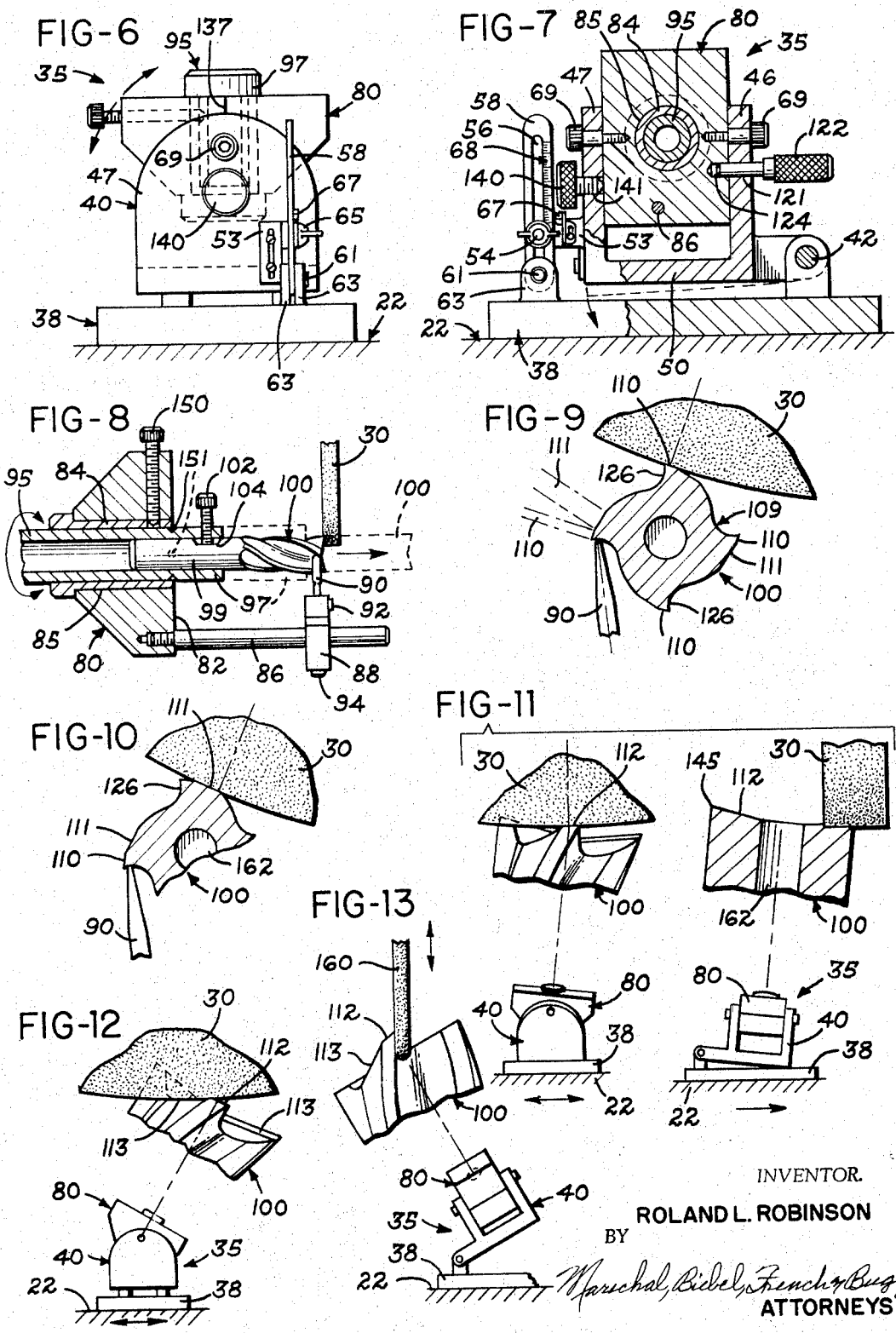

United States Patent Office 3,365,843
Patented Jan. 30, 1968

3,365,843
FIXTURE FOR CUTTING TOOLS
Roland L. Robinson, 202 Park End Drive,
Dayton, Ohio 45415
Filed Mar. 8, 1965, Ser. No. 437,717
5 Claims. (Cl. 51—225)

ABSTRACT OF THE DISCLOSURE

A fixture having a base member mounted on the table of a surface grinder and including an intermediate support member mounted on the base member for pivotable movement on a horizontal axis, a head member having a bushing supporting an arbor for rotary and axial movement and mounted on the support member for rotation on an axis perpendicular to both the axis of the arbor and the pivotable axis of the support member, and the arbor supporting a rotary cutting tool for movement between horizontal and vertical positions for sharpening both generally axially extending surfaces and compound angular end surfaces on the cutting tool.

---

This invention relates to an improved fixture for supporting cutting tools during sharpening, and more particularly, to a fixture which quickly adapts a standard surface grinder for sharpening cutting tools such as end mills, drills, boring bars and the like.

In well equipped machine tool shops it is common to find a surface grinder which includes generally a horizontally positioned magnetic worktable which traverses longitudinally and a vertically adjustable grinding wheel mounted above the table on a horizontal axis of rotation. These grinding machines are practically essential whenever it is desirable to finish a metal part with a smooth, flat surface and/or within close tolerances.

In comparison, the special grinding machine tools which are specifically designed for sharpening cutting tools such as the grinding tool shown in Patent No. 3,164,930, are not intended or designed for other uses such as grinding flat surfaces. In view of the relatively high cost of these sharpening machine tools, on the order of several thousand dollars, it has heretofore been found more economical for many machine tool shops, especially the smaller ones, to send their cutting tools to an outside specialist for sharpening rather than to invest in sharpening machine tool equipment even though this procedure entails expense and delay.

The present invention is directed to a relative inexpensive fixture which is adapted to be placed on the magnetic table of a standard surface grinder for sharpening cutting tools, and thus providing an in-shop sharpening device and eliminating the necessity for sending the cutting tools out and use of a special sharpening machine tool. As a result, the invention provides another use for a surface grinder commonly found in machine shops in addition to its primary use for finishing of flat surfaces on metal parts.

Accordingly, it is a primary object of the invention to provide a relative inexpensive fixture which enables a cutting tool such as an end mill, drill bit, boring bar or the like to be precisely sharpened on a standard surface grinder by a person who is not highly skilled in sharpening cutting tools.

It is another object of the present invention to provide a novel fixture for adjustably supporting a cutting tool on the magnetic table of a surface grinder so that the cutting tool may be positioned either parallel or according to a predetermined angle in relation to the table, and the horizontal traversing and cross feed movement of the table can be employed for grinding on the cutting tool a series of surfaces each parallel to the table.

Still another object of the invention is to provide a novel fixture which supports on the table of a surface grinder an end mill, drill bitt or other cutting tool having spiral flutes and/or the angularly disposed end surfaces can be sharpened with precision.

It is also an object to provide in combination with a surface grinder as outlined above, a fixture which is adapted to be held magnetically on the table of the grinder and includes an arbor for supporting the cutting tool so that the tool can be positioned in any desired angular relationship with the table for presenting the surface to be sharpened in a plane parallel with the table.

Other objects and advantages of tthe invention will be apparent from the following description, the accompanying drawings and the appended claims.

In the drawings—

FIG. 1 is a perspective view of a typical surface grinder including a fixture in accordance with the invention;

FIG. 2 is an enlarged perspective view of the fixture shown in FIG. 1 and showing the assembled relationship of the major components;

FIG. 3 is a perspective view of a four flluted end mill which is a typical cutting tool that can be sharpened on a surface grinder by using a fixture in accordance with the invention;

FIG. 4 is an elevational view of the end portion of a drill bit illustrating another typical cutting tool which can be sharpened on a surface grinder;

FIG. 5 is an enlarged end view of the end mill shown in FIG. 3 showing the different end surfaces which must be sharpened;

FIG. 6 is an elevational end view of the fixture shown in FIG. 2;

FIG. 7 is an elevational side view in part section of the fixture shown in FIG. 2;

FIG. 8 is a detailed sectional view of the head member and arbor for adjustably supporting the end mill shown in FIG. 3 and showing its relationship with the grinding wheel of the surface grinder;

FIG. 9 is a detailed end view of the end mill shown in FIG. 8 showing its relative position with the grinding wheel during the sharpening of the leading spiral edge surface on the end mill of FIG. 3;

FIG. 10 is a detailed section view similar to FIG. 9 showing the grinding of the spiral relief surface on the mill to provide for chip clearance;

FIG. 11 shows combined detailed views of the end mill and grinding wheel and a schematic view of the fixture showing the corresponding compound angular position of the fixture for sharpening the end surfaces of the end mill;

FIG. 12 is a view similar to those shown in FIG. 11 showing the relative angular position of the end mill and fixture in relation to the grinding wheel and worktable during the forming of a chip relief surface on the end mill; and FIG. 13 is an elevational view also similar to those shown in FIG. 11 during the forming of a center relief surface on the end mill.

Referring to the drawings, which illustrate a preferred embodiment of the fixture in accordance with the present invention, the surface grinder 20 shown in FIG. 1 illustrates a typical surface grinder and includes generally an electromagnetic worktable 22 slidably mounted on a base 23 for traversing lengthwise in a reciprocating manner by a suitable hydraulic system and includes a cross feed which may be manually operated by turning a hand wheel 25 or may be power operated to move in small increments. Extending vertically from the base 23 on one side of the worktable 22 is a column 27 which supports the power unit 28 for rotating a grinding wheel 30 about a horizontal axis. By rotating the hand wheel 32 the grinding wheel 30 may be adjusted vertically to control the vertical height between the bottom surface of the grinding wheel 30 and the top surface of the table 22.

Carried by the table 22 is a fixture 35 in accordance with the invention which is shown in detail in FIG. 2. The fixture 35 includes a rectangular shaped base member 38 which is formed from a ferrous material such as steel which enables the base member 38 to be held firmly by the magnetic table 22. Extending upwardly from the top surface of the base member 38 are a pair of ears 39 which support one end of a generally U-shaped support member 40 by a pin 42 extending through the ears 39 and corresponding ears 44 projecting as an integral part of the support member 40. This construction enables the support member to be pivoted angularly in relation to the base member 38.

As shown in FIG. 2, the support member 40 includes a pair of spaced apart end flanges 46 and 47 which are integrally connected by a bottom member 50 to form a rigid U-shaped construction. Extending outwardly from the end flange 47 is a support finger 53 (FIG. 7) on which a bolt 54 is mounted to extend through a slot 56 formed in an adjusting support member 58.

The lower end of the adjusting support member 58 is pivotally connected by the pin 61 extending through a pair of ears 63 projecting vertically from the base member 38. Fastened to the bolt 54 on the opposite side on the adjusting support member 58 is a wing nut 65 by which the support finger 53 is secured rigidly to the adjusting member 58. Thus the support member 40 can be tilted about the pin 42 from a parallel position shown in FIG. 7 to a slightly tilted position of FIG. 11 to an inclined position as schematically shown in FIG. 13. To determine quickly the precise angular setting of the support member 40, a pointer 67 is carried by the support finger 53 to indicate the angular setting by a direct reading from the graduated scale 68 formed on the adjusting member 58.

Pivotally mounted between the end flange 46 and 47 by the aligned shouldered screws 69 (FIG. 7) is a head member 80 through which a hardened steel bushing 84 (FIG. 8) extends to define a cylindrical bore 85. As can be seen from FIG. 7, the pivot axis of the head member 80 as defined by the screws 69 is perpendicular at all times to the pivot axis of the support member 40 about the pin 42 irrespective of the angular position of the support member 40 in relation to the base member 38.

Extending from the front face 82 (FIG. 2) of the head member 80 is a rod 86 which serves to carry a guide member 88. Extending upwardly from the guide member 88 is a finger 90 which can be adjusted longitudinally within the guide member by the set screw 92. In addition, the guide member 88 can be adjusted axially on the rod 86 by the set screw 94 (FIG. 8).

Slidably mounted within the bore 85 is a tubular arbor 95 having a forward end portion 97. A knob 98 is mounted on the opposite end of the arbor 95, enabling the arbor 95 to be gripped manually for extending the arbor axially within the bushing 84.

As shown in FIG. 8, the forward end portion of the arbor 95 is adapted to support the shank portion 99 of the cutting tool such as the illustrative end mill 100. Preferably, a thumb screw 102 is provided in the end portion 97 of the arbor 95 for rigidly securing the cutting tool 100 within the arbor by engaging a corresponding flat 104 normally provided on the shank portion 99 of the tool. For a tool having a smaller diameter shank portion 99 a corresponding bushing (not shown) having a smaller inside diameter is inserted within the forward end portion 97 of the arbor 95. For example, the shank portion 99 of an end mill 100 as illustrated in FIG. 3 is commonly provided in diameters of ⅜", ½", ⅝", ¾", and 1". Thus, with a shank diameter under 1", a suitable bushing is selected having a corresponding internal diameter.

An end mill 100 as shown in FIG. 3 has been selected for purposes of illustrating how a cutting tool is sharpened on a surface grinder by use of the fixture in accordance with the present invention, since the end mill has both axially extending spiral flutes 109 (FIG. 3) defining spiral surfaces 110 and 111 (FIG. 9) which are frequently sharpened, in addition to the end surfaces 112 and 113 (FIG. 5) which must be sharpened more often. It is to be understood, however, that the fixture 35 can also be employed for sharpening other cutting tools, as for example, the drill bit 115 which is partially shown in FIG. 4. On the drill bit, however, only the end surfaces 117 are ground and not the spiral surfaces 119.

In operation, the spiral leading surface 110 of the end mill 100 is ground when the axis of the arbor 95 is horizontal or parallel to the table 22 of the surface grinder. For accurately positioning the head member 80 so that the arbor 95 is positioned precisely parallel to the table 22, preferably a locating pin 122 (FIG. 7) is provided and extends through a hole 121 formed in the flange 46 to engage a corresponding hole 124 formed within the side of the head member 80. The finger 90 is adjusted by the set screws 92 and 94 until it engages the spiral surface 126 of the flute 110.

The arbor 95 is then extended axially with a slight rotary movement so that the grinding wheel 30 dresses the spiral surface 110. Each of the four spiral surfaces 110 is ground by retracting the arbor 95 until the end surfaces 112 of the end mill are withdrawn behind the finger 90 (FIG. 8) whereby the end mill can be indexed by 90° to the next spiral surface 110. By readjusting the finger 90, the end mill is rotatably advanced slightly so that the spiral surfaces 111 are ground on the end mill, as shown in FIG. 10, to provide for a slight chip clearance following the spiral surface 110.

To grind the end surfaces 112 and 113, a shorter arbor 95 is used so that the head member 80 can be pivoted to a nearly vertical position as shown in FIG. 11. Here the axis of the arbor 95 is positioned approximately 85° in relation to the table 22 to provide a 5° chip clearance on the surface 112. For conveniently setting and retaining the head member 80 in an angular position with relation to the support member 40, a graduated scale 135 (FIG. 2) is provided on the top surface of the end flange 47 and correspondingly the head member 80 is provided with indicating line 137 (FIG. 6). Preferably the head member 80 is retained in an angular position by a thumb screw 140 (FIG. 7) which is threaded into a hole 141 formed in the end flange 47 and is adapted to press firmly against the side surface of the head member 80 to form a friction engagement.

As illustrated in the right view shown in FIG. 11, the support member 40 is positioned on a slight angle, for example, approximately of 3° in relation to the base member 38 by the scale 68 so that when the top end of the end mill is passed under the grinding wheel 30, the surface 112 is dressed to a compound angle whereby the surface 112 will taper rearwardly by approximately 5° and inwardly by approximately 3°. This forms a cutting tip 145 which extends axially beyond the remaining end portion of the end mill.

By then withdrawing the locking screw 150 (FIG. 8) from a corresponding conical shaped depression 151 formed in the outer surface of the arbor 95, the end mill 100 can be rotated or indexed through exactly 90° and again locked by the screw 150 in a corresponding depression 151 so that another of the four surfaces 112 can be ground or dressed. In this manner, it can be seen that each of the end surfaces 112 is precisely positioned in relation to the peripheral surface of the grinding wheel 30 according to the compound angle desired whereby each surface 112 is ground parallel to the top surface of the table 22.

Referring to FIG. 12, it is ordinarily desirable to provide a relief surface 113 (FIG. 5) following each of the surfaces 112. This surface can be easily formed on a surface grinder with a fixture in accordance with the invention by simply tilting or pivoting the head member 80 until the axis of the bore 85 lies on an angle approximately 60° in relation to the table 22. Each of the surfaces 113 is then ground in the same manner as described above for the surfaces 112, that is, by the transversing movement of the worktable 22 and by indexing the supporting arbor 95 until it is precisely located by the screw 150.

Another typical use of the fixture 35 is illustrated by the following example. An end mill is positioned on a compound angle of approximately 60° in relation to the table 22 (FIG. 13) by a corresponding compound angular setting of both the support member 40 and the head member 80. While supported in this position, a relatively thin grinding wheel 160 is brought into contact near the center of the end mill to grind the center end portion of the end mill slightly below the surfaces 112. This relief operation is frequently necessary on a solid end mill, which is not provided with an axially extending hole 162 as is the end mill shown in FIG. 5, in order to assure that the end center portion does not interfere and also provides sufficient relief for chips to be removed by the tips 145.

Thus, it can be seen that by adjusting the support member 40 and head member 80, the axis of the arbor 95 can be positioned relative to the table 22 according to any desired angle. As such, it is a simple operation to adjust the fixture for sharpening the end surface 117 of a drill bit (FIG. 4) merely by adjusting the fixture so that the surface to be ground is positioned parallel to the top surface of the table 22. After this, the table 22 of the surface grinder is reciprocated so that the grinding wheel 30 passes back and forth over the cutting tool as the table is fed crosswise either automatically or manually by the hand wheel 25.

As can be seen from the drawings and the above description, the use of the fixture 35 on a surface grinder in accordance with the invention provides a number of advantages and features. Basically, the fixture adapts a surface grinder, which is commonly found in machine tool shops, for sharpening cutting tools. Thus it is no longer necessary to insert in and to employ a specialized machine tool which is constructed solely for sharpening cutting tools and may stand idle much of the time.

Furthermore, by simply noting the graduated scales 68 and 135 and with the use of the magnetic table 22, the arbor 95 can be quickly positioned according to any predetermined compound angle so that any cutting edge on the tool can be sharpened. In fact, by using the fixture 35, it has been found that a person without particular experience in sharpening cutting tools can with a little practice easily and precisely sharpen a multiple surface cutting tool.

Thus the invention provides a new and heretofore unavailable fixture for sharpening cutting tools having multiple cutting edges, as for example, an end mill where each cutting edge must be in precise alignment to avoid chattering and to provide for accuracy in machining with the tool. However, while the principal value and usefulness of the fixture is in precision sharpening of multiple edge cutting tools, it is apparent that the fixture can be used for sharpening tools having only one cutting edge. Furthermore, when it is desirable to reposition the fixture on the table 22 for grinding a particular surface, it can be seen that the fixture can be easily and quickly moved simply by deenergizing the magnetic table and adjusting the fixture to the desired position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fixture for adapting a surface grinder having a horizontally movable worktable and an overhead grinding wheel to sharpen a cutting tool such as end mill, drill or the like, said fixture comprising a base member having a generally flat bottom surface adapted to be secured to the table of the surface grinder, a support member having parallel spaced flanges integrally connected to form a U-shaped configuration, means connecting said support member to said base member adjacent one of said flanges for pivotal movement of said support member about an axis parallel to said bottom surface, a head member having means defining an opening therein, a tubular bushing mounted within said opening and having means defining therein a cylindrical bore of substantial length, means for mounting said head member between said flanges of said support member for pivotable movement of said head member on an axis perpendicular to the pivotal axis of said support member and intersecting the axis of said bore, an arbor supported within said bore for rotary and axial movement and having means defining an opening for receiving the shank portion of a cutting tool to be sharpened, means for rigidly securing the shank portion of the tool within said opening with the tool in axial alignment with said arbor, said head member being rotatable through an angle of at least 90° relative to said support member for moving said arbor between parallel and normal positions relative to said bottom surface of said base member, means defining a plurality of circumferentially spaced recesses on said arbor, means movably supported by said head member for selectively engaging said recesses for positively securing said arbor in selective angular relationship relative to said bushing, said arbor having a cylindrical surface of sufficient diameter and length relative to said bore to maintain the tool in axial alignment with said bore during rotation and axial movement of said arbor within said bore, means adjacent the other said flange of said support member for adjustably retaining said support member in relation to said base member, pin means releasably connecting said head member and said support member for quickly positioning the axis of said bore precisely parallel with said bottom surface of said base member, and means for adjustably retaining said head member in relation to said support member for positioning said arbor between parallel and vertical positions relative to the table for grinding generally axially extending surfaces and predetermined compound angular end surfaces on the cutting tool.

2. A fixture as defined in claim 1 wherein said means adjacent the other said flange of said support member for adjustably retaining said support member in relation to said base member, comprises an elongated member having means defining a slot therein, means for pivotally connecting said elongated member to said base member, and threaded means extending through said slot and connected to said support member.

3. A fixture as defined in claim 1 wherein said means for mounting said head member between said flanges, comprises means defining aligned holes within said flanges of said support member, and a set of shouldered screws extending through said holes and threadably connected to said head member.

4. A fixture as defined in claim 1 wherein each said flange includes a curved upper surface, and graduated scale means associated with said head member and one of said flanges for indicating the angular position of said head member relative to said support member.

5. A fixture as defined in claim 1 wherein said means releasably connecting said head member and said support member, comprises means defining at least one hole within said head member, and pin means slidably mounted on one of said flanges of said support member and engageable with said hole.

References Cited

UNITED STATES PATENTS

| 2,141,187 | 12/1938 | Lehman | 51—225 |
| 2,352,489 | 6/1944 | Melin | 51—216 X |
| 2,413,436 | 12/1946 | Dawson | 51—225 X |
| 2,452,089 | 10/1948 | Wilken. | |
| 2,803,929 | 8/1957 | French | 51—225 X |

HAROLD D. WHITEHEAD, *Primary Examiner.*